Dec. 22, 1959    C. H. MATHIS ET AL    2,918,506
CONTROL OF CHEMICAL REACTION TEMPERATURE
Filed Dec. 1, 1955    3 Sheets-Sheet 1
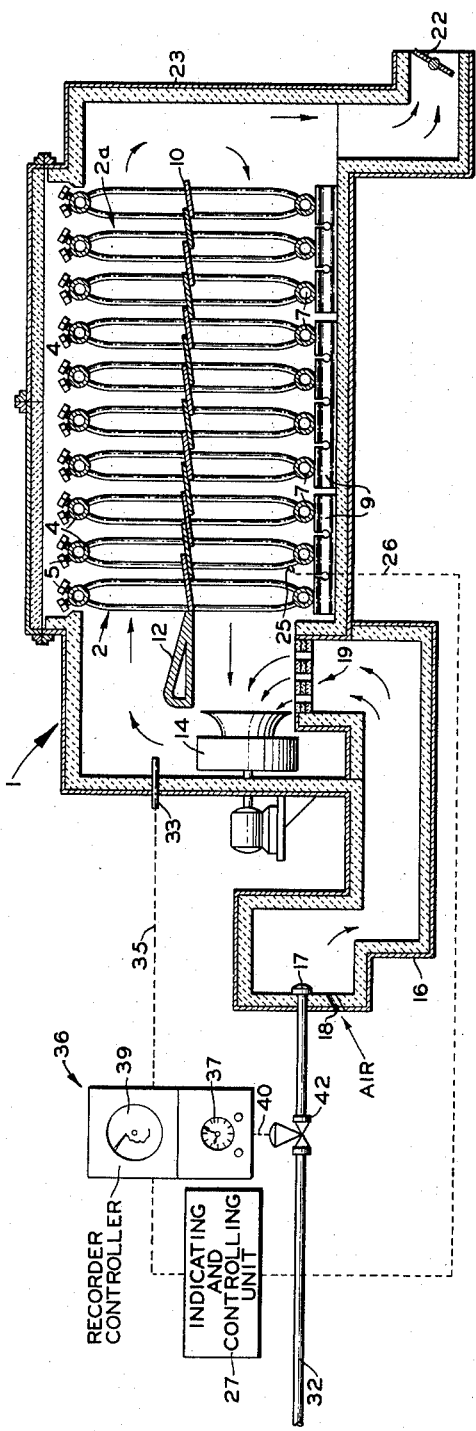
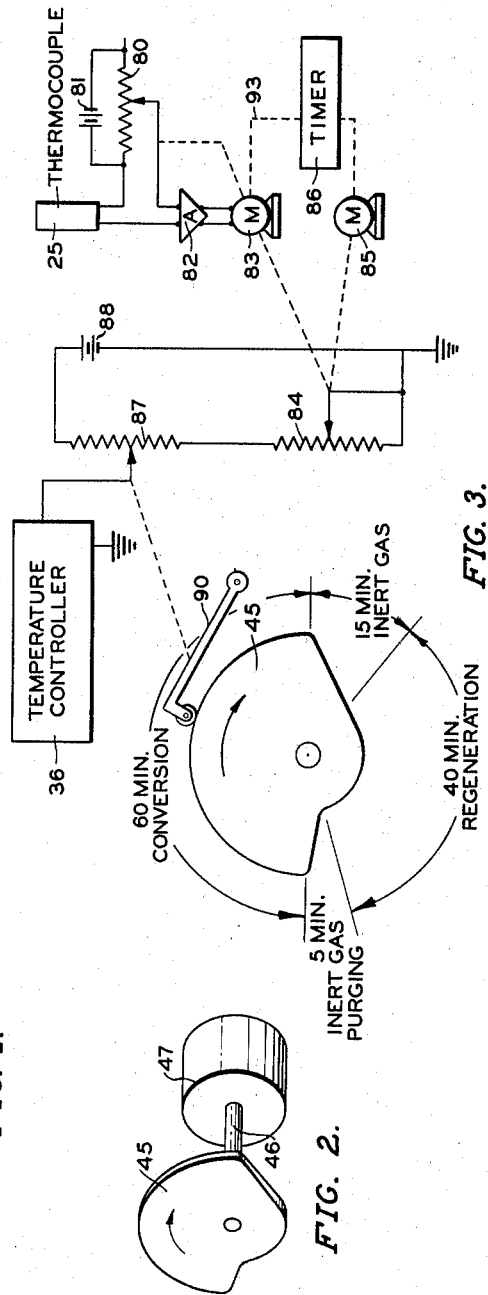
INVENTORS.
C. H. MATHIS
W. P. STROLE
W. L. PARKER
BY
*Hudson & Young*
ATTORNEYS

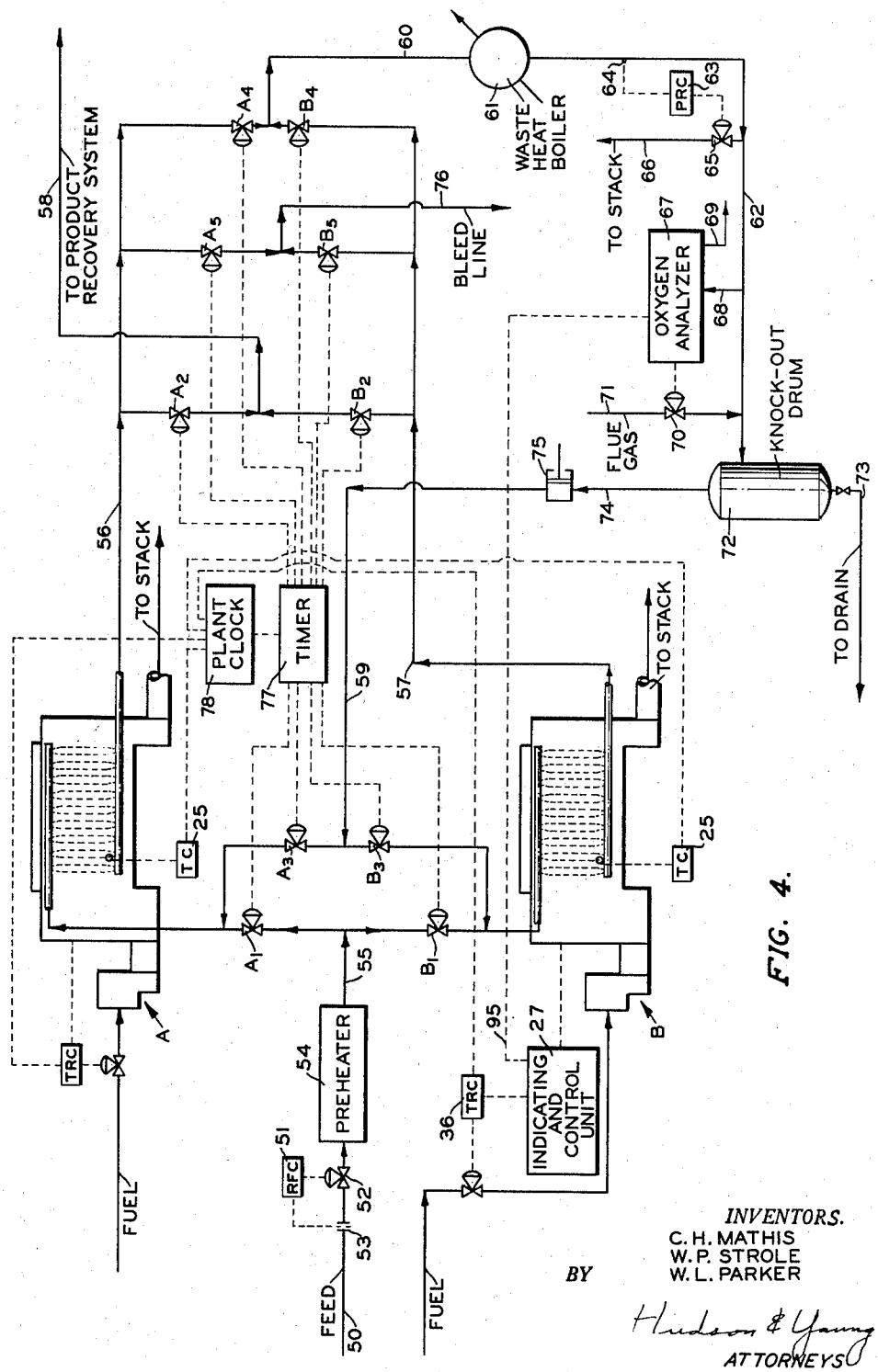

Dec. 22, 1959  C. H. MATHIS ET AL  2,918,506
CONTROL OF CHEMICAL REACTION TEMPERATURE
Filed Dec. 1, 1955  3 Sheets-Sheet 3

INVENTORS.
C. H. MATHIS
W. P. STROLE
BY  W. L. PARKER

Hudson & Young
ATTORNEYS

United States Patent Office 2,918,506
Patented Dec. 22, 1959

2,918,506

CONTROL OF CHEMICAL REACTION TEMPERATURE

Clyde H. Mathis and William P. Strole, Borger, Tex., and Walter L. Parker, Metairie, La., assignors to Phillips Petroleum Company, a corporation of Delaware Application December 1, 1955, Serial No. 550,328

3 Claims. (Cl. 260—683.3)

This invention relates to an improved method and means for controlling the reaction conditions in a hydrocarbon reaction so as to operate as nearly as possible to capacity.

In the dehydrogenation of butane to butene the catalyst is arranged in banks or rows of catalyst-filled tubes called "harps." The butanes are passed rapidly down through these tubes so as to form butenes, some of which are decomposed to coke. There are also some tars formed which collect in the lower portion of the catalyst columns in the tubes. The entire catalyst composite in the several harps is periodically onstream and on regeneration. It is desirable to so coordinate these two stages that the reaction can be run at as high a feed rate as is compatible with the subsequent regeneration step. That is, the reaction should lay down all the coke on the catalyst that the subsequent regeneration can burn off in the time allotted. At the same time the regeneration temperature must not exceed a certain critical valve, which sets a limit on the amount of coke that can be burned off in one cycle. It is evident that the efficiency of the process depends on how well these two factors are coordinated.

It is an object of the invention to provide an improved method and means for coordinating dehydrogenation reaction conditions with the attendant regeneration temperature so as to achieve maximum productivity without loss of catalyst activity. A more specific object is the provision of a method and means for controlling the temperature during the reaction step in response to the temperature of one or more preceding regeneration steps. A further object is the provision of a method and means for controlling the oxygen content of the regeneration gas in response to the temperature of one or more preceding regeneration steps. A further object is the provision of a selected point in the catalyst bed for the measurement of regeneration temperature, this point serving as an index of the regeneration temperature throughout the system.

In the operation of a catalyst case for the conversion of butane to butylenes, the harp next to the fan which blows the flue gas through the case is heated to the highest temperature. This harp gets so hot during regeneration that no attempt is made to closely control its temperature. The remainder of the harps are cooler and approximately equal in temperature. Hot gases are admitted to the catalyst cases to heat the catalyst tubes from the outside and these flue gases are circulated around the catalyst tubes, a portion being discharged from the catalyst case. The temperature of the circulating flue gases is controlled by a cam regulating the rate of gas burned to form hot gases which are added to the catalyst case. The temperature of the circulating gases controls the temperature of the catalyst within the tubes both during dehydrogenation and regeneration of the catalyst. This temperature is measured and recorded by thermocouples. In response to the regeneration temperature the volume of fuel gas injected into the catalyst case heater during the hydrogenation process cycle is controlled so that the regeneration temperature will not exceed a preselected value, say 1400° F.

In the dehydrogenation of butane to butene the greatest concentration of carbon is deposited on the catalyst in the lower part of the tubes, probably due to the drainage of tars down through the catalyst column and their accumulation near the base thereof. During the regeneration of the catalyst, a 6-to-12-inch flame front travels from the top of the catalyst tubes to the bottom. It has been found that the highest temperature during regeneration occurs when the flame front passes a point about six inches from the bottom of the catalyst in the tube. Hence, by placing a thermocouple in contact with the catalyst at this point, one can register the maximum temperature within the column. In general, this temperature should not be over about 1400° F. to prevent damage to the catalyst.

This combination of thermocouples thus coordinates the dehydrogenation and regeneration cycles so that the carbon laid down can be burned during the allotted time with the volume of oxygen available without exceeding a safe regeneration temperature of approximately 1400° F. In this way there is provided a method of measuring the temperature during the rengeration part of the cycle and utilizing this temperature to determine the preferred temperature during the conversion part of the cycle.

Figure 1 is a vertical section through a catalyst case containing the harps used in this invention, and illustrating the cooperation of the control elements therewith;

Figure 2 shows the cam mechanism used in the recorder-controller of Figure 1;

Figure 3 is a view of a control circuit connected to the cam of Figure 2;

Figure 4 is a schematic diagram of a plant embodying the invention; and

Figure 5:
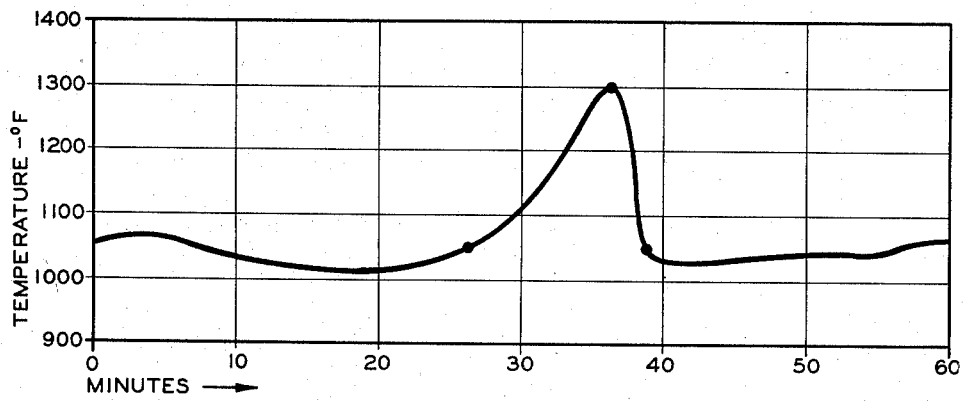
Figures 5, 6 and 7 are graphs illustrating temperature conditions at various stages of the dehydrogenation cycle.

Referring to Figure 1, reference numeral 1 shows a catalyst case containing a plurality of harps, two of which are indicated generally at 2, 2a, it being understood that each harp consists of a row of catalyst tubes lined up behind those shown in the figure. Each harp of tubes is connected at the top to an inlet cross header 4 and at the bottom to an outlet cross header 7. Removable plugs 5 in cross header 4 are inserted in a series of ports through which catalyst can be admitted into the several tubes. These cross headers extend all the way across case 1. One end of inlet cross header 5 extends outside of case 1 and connects to a source of butane during the dehydrogenation stage and to a source of oxidizing gas during regeneration. One end of outlet cross header 7 also extends through case 1 and connects with an exhaust stack (not shown) during regeneration and to a means of butene storage (not shown) during dehydrogenation. Outlet cross header 7 rests on supporting rails 9 disposed in the bottom of case 1. A flexible baffle 10 extends across the case 1 in a plane intersecting the harps 2. A flow directing member 12 is attached to the end of the baffle nearest fan 14.

A conduit 16 conveys heating gas from gas burner 17 and injects it into case 1 through jets 19. Orifices 18 admit sufficient air to burner 17 to support combustion. A damper 22 in outlet conduit 23 controls the amount of gas exhausted from case 1, thereby determining the amount of gas recirculated under baffle 10 toward fan 14. Outlet conduit 23 connects to a stack or other means (not shown) for disposing of exhaust gases.

A thermocouple 33 extends through the inlet end of case 1 to the interior thereof and is connected by control line 35 to recorder-controller 36. The latter may be equipped with a clock 37 (optional) and a temperature recording chart 39. Through control link 40, recorder-controller 36 controls the position of a pneumatically-actuated motor valve 42 in gas line 32, thus controlling the flow of gas past this point. The general operation of air-actuated motor valves is sufficiently well known to those skilled in the art to require no further description; however, a rather detailed discussion of such a valve is available in Serial No. 472,577, filed December 2, 1954, now U. S. Patent 2,873,584, issued February 17, 1959, same assignee. A second thermocouple 25 contacts the lower portion of harp 2a, the second harp from the fan, and is connected by control line 26 to an indicating and control unit 27 which, in turn, can be connected to reset the controller 36, as will be hereafter explained.

Figure 2 illustrates the basic control elements of recorder-controller 36. These consist of a cam 45 mounted on a shaft 46 and driven from member 47. Cam 45 serves to "reset" or regulate the air flow controlling the position of valve 42, this being reset whenever the radius of curvature of the cam changes. Thus, there is a definite control valve position for each new position of the cam. In this way the position of cam 45 regulates through line 40 the gas flow through valve 42. The various control positions of the valve 42 in response to the varying cam radii can be set manually after observing the temperature registered at 39 at various positions of the cam.

Figure 3 illustrates diagrammatically the time cycle through which cam 45 operates. The cam is designed to control the operation of control link 40 and valve 42 in two-hour units of time. This time is shown as divided into four intervals, 60 minutes, 40 minutes, 15 minutes, and 5 minutes. The 60-minute stage is the dehydrogenation portion of the cycle which, being endothermic, requires that valve 42 be wide open to supply maximum fuel. The 5-minute stage is the gradual temperature reduction during the purge and initial regeneration. The 40-minute interval is the exothermic portion of the regeneration stage, wherein the fuel gas injection is at a minimum. The 15-minute sector is the end of the regeneration stage during which time it is necessary to gradually add heat to the case so that the temperature in the tube will be sufficiently high to effect the dehydrogenation process as soon as hydrocarbon is switched to the tubes containing the catalyst.

In a typical example the entire cycle of dehydrogenation and regeneration covers two hours, one hour for the reaction, one hour for the regeneration plus stripping. The stripping is at the beginning of the regeneration phase and involves no more than a 10–30 second purge with regeneration gases containing 2–3% oxygen. This drops the temperature on the thermocouple some 15–20° below reaction temperature; in the last 15–20 minutes of the regeneration, the temperature is raised to the dehydrogenation temperature.

This two-hour cycle requires that the regeneration temperature reach its peak well before the end of its alloted hour, say at 50 minutes, since the final stages of regeneration are characterized by lower temperatures due to the diminishing supply of coke. Hence, if the regeneration temperature "peaks" at almost the end of its allotted hour, say over 50 minutes after regeneration begins, it leaves insufficient time to burn the catalyst clean. This is undesirable because the more coke left on the catalyst when it goes on stream the greater will be its cracking activity and, hence, the greater the subsequent coking. To correct this, the temperature during the next reaction phase is lowered by reducing the amount of gas fed to the preheater; this, in turn, reduces the coke deposition so that the next regeneration can burn the catalyst clean. If, on the other hand, the peak of the regeneration temperature comes too early, say in less than 50 minutes, the temperature in the ensuing reaction step is increased, with accompanying increase in the conversion rate and coke deposition. This should cause the temperature of the next regeneration to peak later.

In the course of these adjustments, however, the temperature of the regeneration should not exceed about 1400° F. although this temperature may be permitted to go as high as 1450° F. when the catalyst is old. Hence, if the regeneration temperature peaks at the right time but exceeds 1400° F., the gas feed must be decreased to lower the temperature, and the temperature of the next reaction stage must be lowered to reduce the coke lay-down proportionately. If, on the other hand, the temperature peaks at the right time but the temperature is below 1400° F., it means that the regenerator is not burning as much coke as it could handle. To correct this, the subsequent reaction temperature is raised enough to effect a higher coke lay-down.

The foregoing discussion can be better understood in connection with Figure 4 whch represents a commercial plant embodying the features of the invention. In this plant, there are two banks A and B of reactors, each including several units of the type illustrated in Figure 1 connected in parallel. In general, one bank of reactors is on dehydrogenation while the catalyst in the other bank is being regenerated. To this end, the feed to be dehydrogenated, specifically butane, is fed through a line 50 under the control of a rate of flow controller 51 operatively connected to a motor valve 52 and having a sensing element 53 in the line 50 upstream of the valve 52. The feed, therefore, passes at a preset rate through a preheater furnace 54 and a line 55, whence it may pass either through a motor valve A1 or B1 to one of the reactor banks A or B. The converted products are withdrawn through effluent lines 56 and 57, respectively, and pass through one of valves A2 or B2 to a common conduit 58 leading to a product recovery system.

Regeneration gas is supplied to the reactor system from a line 59 which is connected through one of a set of valves A3 and B3 connected, respectively, to the reactor banks A and B. The regeneration gas leaves through the effluent lines 56, 57 and is withdrawn through one of a set of valves A4 or B4 to a common outlet conduit 60. This conduit extends through a waste heat boiler 61 to a conduit 62 wherein a constant pressure is maintained by the action of a pressure recorder controller 63 having a pressure sensing element 64 in the line 62 and connected to a motor valve 65 in a vent line 66. Thus, sufficient regeneration gas is bled through the line 66 to maintain a predetermined pressure, say 90 pounds per square inch gauge, in the line 62.

Further, the oxygen content of the regeneration gas is maintained within the predetermined limits, say 2.4 to 2.6%, by an oxygen analyzer 67 having a sample line 68 connected to the line 62 and a sample outlet line 69. The oxygen analyzer 67 is connected to a motor valve 70 in a flue gas inlet line 71, and its action is to admit sufficient flue gas containing about 7 to 10% oxygen as to maintain the oxygen content of the regeneration gas within the desired limits. This gas can enter at a pressure of 100 pounds per square inch gauge, and a temperature of 100° F.

From the line 62, the regeneration gas passes to a knockout drum 72 having a valved drain line 73 and a gas take off line 74 which leads through a compressor 75 to the regeneration gas inlet conduit 59.

The pressure in the reactors can be let down by the action of motor valves A5 and B5 which control the flow through lines connecting the effluent conduits 56 and 57, respectively, to a common bleed line 76.

All the valves A and B are operated in sequence by a timer 77 controlled by a plant clock 78.

The manner in which the valves are controlled so that the reactor groups are alternately on stream and on regeneration will become apparent from the following table which sets forth in detail the operation of these valves.

| Timer | Reactor Bank "A" | Time | | Reactor Bank "B" |
|---|---|---|---|---|
| | | Minutes | Seconds | |
| Timer becomes dormant. Time starts. | Valves A3, A4 close, Regeneration gas off. Bleeder valve A5 opens. Bleeder valve A5 closes. | 0<br>0<br>1<br>1<br>3<br>4 | 0<br>40<br>10<br>30<br>40<br>10 | |
| | Valves A1, A2 open, Hydrocarbon starts. | | | |
| Timer becomes dormant. Timer starts. | | 5<br>5<br>6<br>6<br>60<br>60 | 00<br>40<br>10<br>40<br>0<br>40 | Valves B1, B2 close, hydrocarbon stops.<br>Valves B3, B5 open, Regeneration gas in; bleeder valve opens.<br>Valve B5 closed. Valve B4 open, Bleeder valve closes.<br>Regeneration gas cycled. |
| Timer becomes dormant. Timer stops. | | 61<br>61<br>63<br>64 | 10<br>30<br>40<br>10 | Valves B1, B4, close; regeneration gas off.<br>Bleeder valve B5 opens.<br>Bleeder valve B5 closes.<br>Valves B1, B2 open; Hydrocarbon starts. |
| | Valves A1, A2 close, Hydrocarbon stops.<br>Valve A3, A5 open; Regeneration gas in; Bleeder valve opens.<br>Valve A5, closed, Valve A4 open; Bleeder valve closes; regenerating gas cycled. | 65<br>65<br>66 | 00<br>40<br>10 | |
| Timer becomes dormant. Timer starts. | | 66<br>120<br>New cycle starts | 40<br>0 | |

It will be noticed that, at various intervals, as indicated by the left-hand column, the timer becomes dormant for a period until it is again energized by the plant clock. Following through the operation of reactor group A, it will be noted that the valves A3 and A4 close to stop the flow of regeneration gas at the end of the regeneration period. Thereupon, valve A5 opens for a period of twenty seconds during which the pressure is bled from 100 pounds per square inch gauge to the stack pressure existing at plant line 76. Thereupon, valves A1 and A2 open to permit hydrocarbon to flow through reactor group A. It will be noted that for the first fifty seconds of the dehydrogenation cycle, the feed is flowing through both groups of reactors at one-half its normal rate. Thereupon, hydrocarbon feed flows at the full rate until the end of the dehydrogenation cycle. At the end of the process cycle, valves A3 and A5 open to bleed the hydrocarbon pressure from the reactors for a period of about 30 seconds. Thereupon, the bleeder valve A5 closes and the regeneration gas thereafter is fed to the conduit 60 whence it is cycled back to the conduit 59. A new cycle of operations is initiated at the end of the regeneration period.

The operation of reactor group B is entirely similar, and can be readily followed from the drawing.

Figure 6:
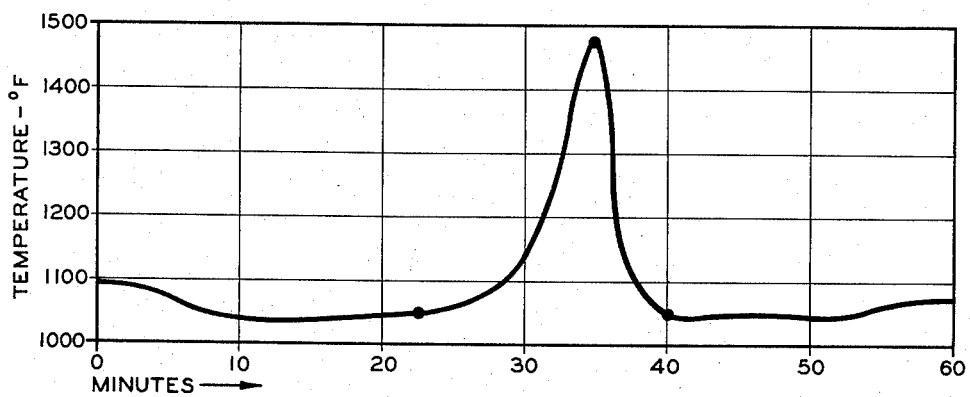
Figure 7:
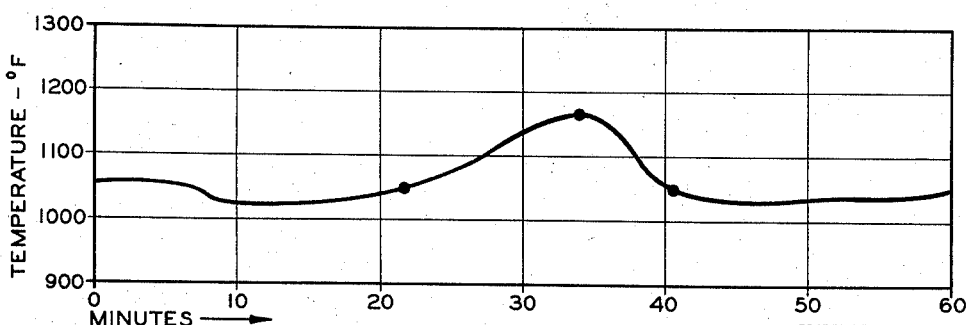

Utilizing a typical catalyst comprising 20% chromium oxide and 0.3% sodium on gamma alumina, process conditions result in the curves depicted by Figures 5, 6 and 7 for various temperatures during the regeneration cycle and oxygen contents of the regeneration gas. The time base in each of these figures is the start of the regeneration cycle. The graph of Figure 5 represents a normal regeneration cycle where the temperature reaches a peak of about 1300° F. about 37 minutes after the start of the regeneration period. Figure 6 represents a condition where the temperature of the catalyst has become abnormally high during the regeneration period where serious damage to the catalyst can result if the high temperature condition is not corrected. In particular, it will be noted that a peak temperature of almost 1500° F. is reached about 34 minutes after the start of regeneration. In Figure 7, which represents a relatively new catalyst, the peak temperature is approximately 1100° F. which indicates that more productivity can be obtained, i.e., throughput can be increased, on certain process cycles without harming the catalyst.

In accordance with the present invention, the thermocouples 25 permit the process to be operated efficiently, either manually or automatically, to provide maximum productivity without harming the catalyst.

In one aspect of the invention, the temperature is automatically controlled during the next conversion cycle to compensate either for an excessive temperature during the regeneration step or an unduly low temperature during this regeneration step. To this end, we have shown in Figure 3, thermocouple 25 is connected through a potentiometer 80 having a current source 81 in parallel therewith to the input terminals of an amplifier 82, the output of which is fed to a motor 83 connected to the contactor of potentiometer 80 and to the contactor of a variable resistance 84. The connection between motor 83 and the contactor of potentiometer 84 is such that the contactor is moved to a position, during the process cycle, corresponding to the highest temperature reached during that cycle, and remains there until it is reset to a low temperature position by a motor 85 energized by a timer 86.

The variable resistance 84 is connected in series with a potentiometer 87 and a battery 88, the contactor of potentiometer 87 being mechanically connected to cam follower 90 cooperating with the cam 45, and being connected electrically to the input of temperature controller 36.

It will be evident, therefore, that temperature controller 36 is normally actuated by cam 45 to provide a preset temperature during the conversion cycle. However, due to the series connection of potentiometer 87 and variable resistance 84, this temperature is also modified in accordance with the highest temperature reached during the preceding process cycle. In one particular instance, temperature peaks as indicated below cause a corresponding temperature adjustment during the ensuing process cycle.

| Temperature peak | Temperature Reduction—Next Process Cycle |
| --- | --- |
| 1,430–1,450 F | 5 F. for 2 cycles. |
| 1,450–1,475 F | 10 F. for 2 cycles. |
| 1,475–1,500 F | 15 F. for 2 cycles. |
| 1,500–1,525 F | 20 F. for 2 cycles. |
| 1,525–1,550 F | 25 F. for 2 cycles. |

Thus, danger of excessive temperature and consequent danger to the catalyst are avoided automatically by stepwise corresponding reductions in temperature during the process cycle after the regeneration cycle during which the excessive temperature was encountered. In some instances, as noted above, it is desired to have the corrections occur during two or more process cycles after an excessive temperature is reached in a given regeneration cycle. To this end, we have indicated a connection 93 between the motor 83 and timer 86 which is operable to disable this timer for one or two cycles after an excessive temperature is indicated by the position of motor 83. In this fashion, the variable resistance 84 is not reset until the timer is no longer disabled so that the correction is made during two or any desired number of process cycles following the regeneration cycle on which the excessive temperature was encountered. It will be evident that the desired control can be effected manually, if desired, by changing the contour of the cam 45 for one or more process cycles after an excessive temperature is noted on the thermocouple 25.

As previously indicated, the control can be effected through regulation of the oxygen content of the regeneration gases. To this end, we have shown a connection 95 between the control unit 27 and the oxygen analyzer 67. The control action can be effected by a system of the same type described in connection with Figure 3, and is operative to decrease the oxygen content of the regeneration gases during one or more regeneration cycles following that during which an excessive temperature is encountered. Alternatively, the oxygen content of the regeneration gases is increased during one or more regeneration cycles following a regeneration cycle at which a continuously low temperature peak is encountered.

While the invention has been described in connection with present, preferred embodiments thereof, it is to be understood that this description is illustrative only and is not intended to limit the invention.

We claim:
1. In a catalytic conversion method, the steps which comprise first passing a feed to be converted downwardly through a plurality of elongated, substantially vertical catalyst beds in parallel flow during an endothermic conversion cycle, a deposit of carbonaceous material being deposited on said catalyst as a result of said conversion, thereafter passing an oxygen-containing regeneration gas downwardly in parallel flow through said beds during an exothermic regeneration cycle and thereafter repeating these cycles; during said conversion and regeneration cycles effecting indirect heat exchange between said beds and a heated gas stream by passing said heated gas stream in indirect heat exchange relationship normally to said beds, sensing the temperature during the regeneration cycle in the second catalyst bed downstream with respect to the heated gas stream which is passed in indirect heat exchange relationship with said catalyst beds, said temperature being sensed at a point near the bottom of said catalyst bed at a point of high carbon concentration; and decreasing the temperature level of said heated gas stream throughout a number of subsequent conversion cycles responsive to sensing, at said point during said regeneration cycle, a temperature approaching a temperature above which catalyst activity is excessively impaired.

2. A catalytic conversion method of claim 1 wherein said feed comprises butane and where said butane is converted to butene by dehydrogenation.

3. A method of claim 1, including in combination therewith a step of maintaining the oxygen content of the regeneration gas at a concentration such that the regeneration of the catalyst is complete during the said regeneration cycle.

References Cited in the file of this patent

UNITED STATES PATENTS

| 2,073,650 | Prickett | Mar. 16, 1937 |
| 2,436,041 | Gerhold et al. | Feb. 17, 1948 |
| 2,474,014 | Seebold | June 21, 1949 |
| 2,499,964 | McRae | Mar. 7, 1950 |
| 2,666,692 | Dolezal et al. | Jan. 19, 1954 |